(12) United States Patent
Lim

(10) Patent No.: US 10,609,045 B2
(45) Date of Patent: Mar. 31, 2020

(54) AUTONOMIC INCIDENT TRIAGE PRIORITIZATION BY PERFORMANCE MODIFIER AND TEMPORAL DECAY PARAMETERS

(71) Applicant: Certis Cisco Security Pte Ltd, Singapore (SG)

(72) Inventor: Keng Leng Albert Lim, Singapore (SG)

(73) Assignee: Certis Cisco Security Pte Ltd, Singapore (SG)

( * ) Notice: Subject to any disclaimer, the term of this patent is extended or adjusted under 35 U.S.C. 154(b) by 270 days.

(21) Appl. No.: 15/741,182

(22) PCT Filed: Jun. 29, 2017

(86) PCT No.: PCT/SG2017/050326
§ 371 (c)(1),
(2) Date: Dec. 29, 2017

(87) PCT Pub. No.: WO2019/004928
PCT Pub. Date: Jan. 3, 2019

(65) Prior Publication Data
US 2019/0098025 A1    Mar. 28, 2019

(51) Int. Cl.
*H04L 29/06* (2006.01)
*G06F 21/55* (2013.01)
(Continued)

(52) U.S. Cl.
CPC ........ *H04L 63/1416* (2013.01); *G06F 21/554* (2013.01); *G06N 20/00* (2019.01);
(Continued)

(58) Field of Classification Search
CPC ............ H04L 63/1416; H04L 41/0609; H04L 41/0613; H04L 63/1425; H04L 63/1441; H04L 63/20; G06N 20/00; G06F 21/554
(Continued)

(56) References Cited

U.S. PATENT DOCUMENTS 6,906,709 B1 * 6/2005 Larkin ................ H04L 63/1433
                                                       345/419
7,490,356 B2 * 2/2009 Lieblich ................ G06F 21/316
                                                       379/93.02
(Continued)

FOREIGN PATENT DOCUMENTS

WO    WO2005/048022    5/2005
WO    WO2017/018926    2/2017

OTHER PUBLICATIONS

International Search Report from Australian Patent Office dated Sep. 14, 2017 for relating International Application No. PCT/SG2017/050326.
(Continued)

*Primary Examiner* — Shahriar Zarrineh
(74) *Attorney, Agent, or Firm* — BakerHostetler (57) ABSTRACT

This invention relates to a system and method for prioritizing an incident triage process in an autonomic manner. In particular, the system employs performance modifier indicators and temporal decay parameters to autonomously compile, adjust and demonstrate a list of prioritized incidents in a dynamic manner.

20 Claims, 5 Drawing Sheets

(51) Int. Cl.
*G06N 20/00* (2019.01)
*H04L 12/24* (2006.01)

(52) U.S. Cl.
CPC ...... *H04L 41/0609* (2013.01); *H04L 41/0613* (2013.01); *H04L 63/1425* (2013.01); *H04L 63/1441* (2013.01); *H04L 63/20* (2013.01)

(58) Field of Classification Search
USPC .......................................................... 726/22
See application file for complete search history.

(56) References Cited

U.S. PATENT DOCUMENTS

| | | | | |
|---|---|---|---|---|
| 7,954,161 | B1* | 5/2011 | Guruswamy | G06F 21/577 726/22 |
| 8,495,747 | B1* | 7/2013 | Nakawatase | G06F 21/577 726/25 |
| 8,918,883 | B1* | 12/2014 | Boyle | G06F 21/577 726/25 |
| 9,094,448 | B2* | 7/2015 | Benefield | G06F 21/577 |
| 10,095,866 | B2* | 10/2018 | Gong | G06F 21/577 |
| 10,135,862 | B1* | 11/2018 | McClintock | G06F 21/554 |
| 2002/0056009 | A1* | 5/2002 | Affif | G06F 9/451 709/246 |
| 2004/0044912 | A1* | 3/2004 | Connary | H04L 43/045 726/23 |
| 2009/0254970 | A1* | 10/2009 | Agarwal | G06F 21/554 726/1 |
| 2009/0328222 | A1* | 12/2009 | Helman | G06F 21/554 726/25 |
| 2010/0100964 | A1* | 4/2010 | Mahaffey | G06F 21/554 726/25 |
| 2012/0143650 | A1* | 6/2012 | Crowley | G06F 21/554 705/7.28 |
| 2012/0304300 | A1 | 11/2012 | LaBumbard | |
| 2013/0031634 | A1* | 1/2013 | McClure | G06F 21/552 726/25 |
| 2013/0055387 | A1* | 2/2013 | Kim | G06F 21/55 726/22 |
| 2013/0074188 | A1 | 3/2013 | Giakouminakis et al. | |
| 2013/0191919 | A1* | 7/2013 | Basavapatna | G06F 21/577 726/25 |
| 2013/0247205 | A1* | 9/2013 | Schrecker | G06F 21/577 726/25 |
| 2013/0318600 | A1* | 11/2013 | Serrano | G06F 21/6245 726/22 |
| 2014/0137257 | A1* | 5/2014 | Martinez | H04L 63/1433 726/25 |
| 2014/0173739 | A1* | 6/2014 | Ahuja | G06F 21/577 726/25 |
| 2014/0351940 | A1* | 11/2014 | Loder | H04L 63/1433 726/25 |
| 2015/0244732 | A1* | 8/2015 | Golshan | G06F 21/561 726/24 |
| 2016/0072836 | A1* | 3/2016 | Hadden | H04L 63/1441 726/23 |
| 2016/0164916 | A1* | 6/2016 | Satish | G06F 16/285 726/1 |
| 2016/0182566 | A1* | 6/2016 | Bean | H04L 63/20 726/22 |
| 2016/0248800 | A1* | 8/2016 | Ng | H04L 63/20 |
| 2016/0294858 | A1* | 10/2016 | Woolward | G06F 21/552 |
| 2016/0352774 | A1* | 12/2016 | Akcin | H04L 63/1441 |
| 2016/0359891 | A1 | 12/2016 | Pang et al. | |
| 2016/0371597 | A1* | 12/2016 | Chandramohan | G06Q 10/00 |
| 2016/0371968 | A1* | 12/2016 | Almansour | H04L 63/123 |
| 2017/0228658 | A1* | 8/2017 | Lim | H04L 63/1425 |
| 2018/0324202 | A1* | 11/2018 | Lim | G06F 3/04883 |
| 2019/0098025 | A1* | 3/2019 | Lim | G06N 20/00 |

OTHER PUBLICATIONS

Written Opinion from Australian Patent Office dated Sep. 14, 2017 for relating International Application No. PCT/SG2017/050326.

* cited by examiner

AUTONOMIC INCIDENT TRIAGE PRIORITIZATION BY PERFORMANCE MODIFIER AND TEMPORAL DECAY PARAMETERS

CROSS REFERENCED APPLICATIONS

The present application is a PCT national phase filing of PCT Application Number PCT/SG2017/050326 filed on Jun. 29, 2017 that is hereby incorporated by reference as if set forth herewith.

FIELD OF THE INVENTION

This invention relates to a system and method for prioritizing an incident triage process in an autonomic manner. In particular, the system employs performance modifier indicators and temporal decay parameters to autonomously compile, adjust and demonstrate a list of prioritized incidents in a dynamic manner.

SUMMARY OF THE PRIOR ART

Cyber-attacks on computer enterprise networks and/or network devices of organizations occur almost on a daily basis. It is of utmost importance that such attacks are thwarted as these attacks can create detrimental operational problems and generate negative financial consequences for affected organizations. For example, incidents involving cyber-attacks such as Trojan horses, ransomware, denial of service attacks, viruses, worms, and other similar types of malicious software can have a serious negative impact on the confidentiality, integrity, and availability of computer networks, network components, and data of the organization.

Unfortunately, incidents that may affect an organization's daily operation are not limited only to digital incidents. In fact, physical incidents that cause physical assets in the organization's network to become compromised will also cause operational issues for the organization. Hence, a data security incident may be termed as an incident that is associated with many different types of unauthorized activities involving physical devices and/or sensitive data. Examples of devices affected by physical incidents include computing devices such as computers, mobile computers, mobile devices, application servers, and networking devices such as routers, switches and firewalls while examples of data security incidents include lost or stolen information, lost or stolen devices, devices compromised by malware or accessed without authorization, and internet based cyber-attacks.

Organizations tend to utilize incident management systems to consolidate information received about occurrences of incidents and to manage the response to these data security incidents. Current incident management systems and methods typically provide the ability for intelligence analysts to track how the incidents are being handled and the order in which the incidents are handled.

A conventional incident management system may include a system for consolidating incident reports from all network devices. The system then proceeds to generate a report highlighting suspicious incidents to a security analyst. The security analyst then has to manually assess all the suspicious incidents and validate the incidents to determine if the incidents warrant a response. If required, the incidents are entered into a queue system whereby they are resolved or mitigated in turn by analysts.

Existing legacy security solutions typically employ a structured process (e.g. signature and heuristics matching) for consolidating incidents and generating an incident queue list whereby higher priority incidents are usually flagged to be attended to first before lower priority incidents. However, these solutions do not have the ability to adapt to coordinated activities between assets under monitor and variations in the occurrences of the incidents. This occurs because a large number of alerts are continuously produced due to the inability of legacy systems to effectively prioritize incidents thereby creating an overload of alerts. The intelligence provided by such legacy systems is therefore often not actionable in an effective and efficient manner.

In view of the above, ways need to be found to better mitigate new attacks, identify compromised systems, reduce resolution time; lower resolution cost and to efficiently prioritize resolution of incidents. Sadly, the coverage, context, and cost of current solutions may prevent customers from achieving those objectives.

Those skilled in the art have proposed a method to address the prioritization issues mentioned above by establishing guidelines in advance for determining the appropriate response to be applied to each type of security event. The established guidelines may have to be prepared beforehand by senior members of the security team, and may include procedures, best practices, checklists, etc. to respond to various incidents. The guidelines are then used to prioritize the resolution of the incidents. However, in certain instances, when the guidelines set up and used by the security team, senior management, and the IT organization employ third party applications and services, this may in turn result in incompatible or overlapping services. The ad hoc nature of the response may also result in an inconsistent event management process where time required to address issues may be heavily dependent upon various factors, such as the skill of the senior security team in forecasting likely event scenarios, and the skill of the particular security analyst performing the resolution/mitigation efforts. Further, the requirement for manual interventions may increase the possibility of deriving inconsistent and unreliable performance metrics.

To expedite matters, in addition to having guidelines established in advance, standardized workflows have also been developed to facilitate the use of consistent security operating procedures in response to detected incidents, and the automation of standard actions. In reality, when incidents are detected and reported, these incidents are not known to occur in single instances. Instead, multiple incidents may be pending resolution at any given time. This means that when a resource is allocated to respond to a specific security incident according to predetermined workflows or guidelines; that particular resource will be unavailable to attend to other concurrent incidents, or to even maintain day-to-day operations. The allocation of resources to specific incidents involves trade-offs between the resolution of an incident in the place of another. Thus, even if workflows are standardized and certain actions are automated, there remains the issue of effectively prioritizing responses to multiple, overlapping incidents.

For the above reasons, those skilled in the art are constantly striving to come up with a system and method for prioritizing incident triages in an autonomic manner based on performance modifier indicators and temporal decay parameters.

SUMMARY OF THE INVENTION

Systems and methods for prioritizing incident triages in an autonomic manner based on performance modifier indicators and temporal decay parameters are proposed, and these systems and methods are set out below in accordance with embodiments of the invention.

A first improvement proposed by embodiments of systems and methods in accordance with embodiments of the invention is that the invention effectively arbitrates and prioritizes incidents affecting a multitude of client systems that are under the invention's care whereby the arbitration and prioritization of the incidents by the invention occurs in real-time and are dependent on parameters provided by the client, the severity of the incidents and/or temporal decay parameters associated with each incident. As a result, this allows serious incidents to be effectively and efficiently highlighted to security analysts.

A second improvement proposed by embodiments of systems and methods in accordance with embodiments of the invention is that the generation of the prioritized incident list is autonomous and requires minimal human interaction.

A third improvement proposed by embodiments of systems and methods in accordance with embodiments of the invention is that the invention enables hazardous outlier incidents to be highlighted by further optimizing the prioritized incident list based on incident outliers contained in a normalized plot.

The above improvements are provided by embodiments in accordance with the invention operating in the following manner.

According to a first aspect of the invention, a method for autonomic incident triage prioritization of incidents affecting a plurality of computer systems is disclosed, the method performed by a computing module comprising: receiving user defined parameters associated with each of the computer systems and receiving asset parameters associated with each asset contained within each of the computer systems; receiving incidents affecting assets of the computer systems; computing an incident asset score for each incident whereby the incident asset score is computed using the asset parameters associated with each asset contained within each computer system; assigning incident severity values for each of the received incidents; computing incident severity scores for each of the received incidents based on the incident severity value of the incident and the incident asset score of the incident; generating a prioritized incident list based on the incident severity scores of the received incidents; and providing the prioritized incident list to security analysts.

According to an embodiment of the first aspect of the disclosure, the computing the incident asset score for each incident comprises: retrieving, for each incident, identities of assets affected by the incident, wherein for each asset affected by the incident, retrieving identities of all the assets contained in a computer system related to the affected asset; retrieving severity weightage values accorded to all the retrieved identities of assets wherein the severity weightage values are contained within the received asset parameters; computing the incident asset score for each incident by summing severity weightage values of assets contained in a computer system affected by the incident, summing the severity weightage values of all the assets in the computer system, and dividing the summed severity weightage values of assets contained in the computer system affected by the incident with the summed severity weightage values of all the assets in the computer system.

According to an embodiment of the first aspect of the disclosure, the assigning the incident severity values for each of the received incidents comprises: identifying normalized incidents from the received incidents and allocating predetermined incident severity values to normalized incidents; identifying un-normalized incidents and determining, using a machine learning model, if the un-normalized incidents may be matched to normalized incidents; whereby for each un-normalized incident that matches a normalized incident, allocating the incident severity value of the normalized incident to the un-normalized incident;

for each un-normalized incident that does not match a normalized incident, allocating a predetermined high incident severity value to the un-normalized incident whereby the high incident severity value comprises a value that is within an upper range of the predetermined incident severity values for normalized incidents.

According to an embodiment of the first aspect of the disclosure, the user defined parameters comprises service level values associated with each of the computer systems and whereby the computing the incident severity scores for each of the received incidents based on the incident severity value of the incident and the incident asset score of the incident comprises: applying the service level values associated with each computer system to incident severity scores of incidents that affect assets of the computer system.

According to an embodiment of the first aspect of the disclosure, the computing the incident severity scores for each of the received incidents based on the incident severity value of the incident and the incident asset score of the incident comprises: plotting a normalized plot using the incident severity scores of the received incidents; determining outlier incidents using the normalized plot; and applying a positive reputation coefficient to the incident severity scores of the outlier incidents, whereby the positive reputation coefficient causes incident severity scores of the outlier incidents to increase.

According to an embodiment of the first aspect of the disclosure, comprising determining from the normalized plot commonly occurring incidents; and applying a negative reputation coefficient to the incident severity scores of the commonly occurring incidents whereby the negative reputation coefficient causes incident severity scores of the commonly occurring incidents to decrease.

According to an embodiment of the first aspect of the disclosure, the user defined parameters comprises base response time parameters that are associated with each of the computer systems, the method further comprising: computing an incident response time for each of the received incidents based on the base response time parameter of the computer system associated with each incident and the incident severity score of each received incident, the incident response time being determined as:

$$\text{Incident Response Time} = \text{Base Response time} \times 2^{(\alpha - \text{Incident Severity Score})}$$

where $\alpha$ is a constant having a value equivalent to a largest computed incident severity score for received incidents.

According to an embodiment of the first aspect of the disclosure, the method comprises comprising: receiving elapsed time for the received incidents from the security analysts; determining, for each received incident, if the elapsed time of the incident exceeds the incident response time of the incident; tagging incidents having elapsed time that exceeds the incident response time of the incident with an expired flag; and optimizing the predetermined incident severity values of normalized incidents tagged with expired flags.

According to an embodiment of the first aspect of the disclosure, the optimizing the predetermined incident severity values of normalized incidents tagged with expired flags comprises: applying a positive reputation coefficient to the incident severity value of incidents tagged with the expired flag to cause these incident severity values to increase.

According to an embodiment of the first aspect of the disclosure, the method comprises receiving an unresolved incident list from the intelligence analysts wherein the unresolved incident list comprises incidents that remain unresolved; notifying a system administrator of the unresolved incidents in the unresolved incident list; and removing the unresolved incidents from the computing module.

According to a second aspect of the invention, a system for autonomic incident triage prioritization of incidents affecting a plurality of computer systems is disclosed, the system comprising: a processing unit; and a non-transitory media readable by the processing unit, the media storing instructions that when executed by the processing unit, cause the processing unit to: receive user defined parameters associated with each of the computer systems and receiving asset parameters associated with each asset contained within each of the computer systems; receive incidents affecting assets of the computer systems; compute an incident asset score for each incident whereby the incident asset score for each incident is computed using the asset parameters associated with each asset contained within each computer system; assign incident severity values to each of the received incidents; compute incident severity scores for each of the received incidents based on the incident severity value of the incident and the incident asset score of the incident; generate a prioritized incident list based on the incident severity scores of the received incidents; and provide the prioritized incident list to security analysts.

According to an embodiment of the second aspect of the disclosure, the instructions to compute the incident asset score for each incident comprises: instructions for directing the processing unit to: retrieve, for each incident, identities of assets affected by the incident, wherein for each asset affected by the incident, retrieving identities of all the assets contained in a computer system related to the affected asset; retrieve severity weightage values accorded to all the retrieved identities of assets wherein the severity weightage values are contained within the received asset parameters; compute the incident asset score for each incident by summing severity weightage values of assets contained in a computer system affected by the incident, summing the severity weightage values of all the assets in the computer system, and divide the summed severity weightage values of assets contained in the computer system affected by the incident with the summed severity weightage values of all the assets in the computer system.

According to an embodiment of the second aspect of the disclosure, the instructions to assign the incident severity values to each of the received incidents comprises: instructions for directing the processing unit to: identify normalized incidents from the received incidents and allocating predetermined incident severity values to normalized incidents; identify un-normalized incidents and determining, using a machine learning model, if the un-normalized incidents may be matched to normalized incidents; whereby for each un-normalized incident that matches a normalized incident, allocating the incident severity value of the normalized incident to the un-normalized incident; for each un-normalized incident that does not match a normalized incident, allocating a predetermined high incident severity value to the un-normalized incident whereby the high incident severity value comprises a value that is within an upper range of the predetermined incident severity values for normalized incidents.

According to an embodiment of the second aspect of the disclosure, the instructions to assign the incident severity values to each of the received incidents comprises: instructions for directing the processing unit to: identify normalized incidents from the received incidents and allocating predetermined incident severity values to normalized incidents; identify un-normalized incidents and determining, using a machine learning model, if the un-normalized incidents may be a close match to normalized incidents; whereby for each un-normalized incident that is a close match of a normalized incident, allocating a prorated incident severity value of the normalized incident to the un-normalized incident based on the percentage of the match between the un-normalized incident and the close matched normalized incident; for each un-normalized incident that does not match a normalized incident, allocating a predetermined high incident severity value to the un-normalized incident whereby the high incident severity value comprises a value that is within an upper range of the predetermined incident severity values for normalized incidents.

According to an embodiment of the second aspect of the disclosure, the user defined parameters comprises service level values associated with each of the computer systems and whereby the instructions to compute the incident severity scores for each of the received incidents based on the incident severity value of the incident and the incident asset score of the incident comprises: instructions for directing the processing unit to: apply the service level values associated with each computer system to incident severity scores of incidents that affect assets of the computer system.

According to an embodiment of the second aspect of the disclosure, the instructions to compute the incident severity scores for each of the received incidents based on the incident severity value of the incident and the incident asset score of the incident comprises: instructions for directing the processing unit to: plot a normalized plot using the incident severity scores of the received incidents; determine outlier incidents using the normalized plot; and apply a positive reputation coefficient to the incident severity scores of the outlier incidents, whereby the positive reputation coefficient causes incident severity scores of the outlier incidents to increase.

According to an embodiment of the second aspect of the disclosure, the system further comprises: instructions for directing the processing unit to: determine from the normalized plot commonly occurring incidents; and apply a negative reputation coefficient to the incident severity scores of the commonly occurring incidents whereby the negative reputation coefficient causes incident severity scores of the commonly occurring incidents to decrease.

According to an embodiment of the second aspect of the disclosure, the user defined parameters comprises base response time parameters that are associated with each of the computer systems, the method further comprising: instructions for directing the processing unit to: compute an incident response time for each of the received incidents based on the base response time parameter of the computer system associated with each incident and the incident severity score of each received incident, the incident response time being determined as:

$$\text{Incident Response Time} = \text{Base Response time} \times 2^{(\alpha - \text{Incident Severity Score})}$$

where $\alpha$ is a constant having a value equivalent to a largest computed incident severity score for received incidents.

According to an embodiment of the second aspect of the disclosure, the system further comprises: instructions for directing the processing unit to: receive elapsed time for the received incidents from the security analysts; determine, for each received incident, if the elapsed time of the incident exceeds the incident response time of the incident; tag incidents having elapsed time that exceeds the incident response time of the incident with an expired flag; and optimize the predetermined incident severity values of normalized incidents tagged with expired flags.

According to an embodiment of the second aspect of the disclosure, the instructions to optimize the predetermined incident severity values of normalized incidents tagged with expired flags comprises: instructions for directing the processing unit to: apply a positive reputation coefficient to the incident severity value of incidents tagged with the expired flag to cause these incident severity values to increase.

According to an embodiment of the second aspect of the disclosure, the system further comprises: instructions for directing the processing unit to: receive an unresolved incident list from the intelligence analysts wherein the unresolved incident list comprises incidents that remain unresolved; notify a system administrator of the unresolved incidents in the unresolved incident list; and remove the unresolved incidents from the computing module.

BRIEF DESCRIPTION OF THE DRAWINGS

The above advantages and features in accordance with this invention are described in the following detailed description and are shown in the following drawings.

DETAILED DESCRIPTION

Embodiments of this invention related to a system and method for prioritizing incident triages in an autonomic manner. In particular, the system employs performance modifier indicators and temporal decay parameters to autonomously compile, adjust and demonstrate a list of prioritized incidents in a dynamic manner. The performance modifier indicators are based on user defined variables while the temporal decay parameters are obtained based on each incident's response time and the amount of time taken in resolving an incident.

One skilled in the art will recognize that many functional units in this description have been labelled as modules throughout the specification. The person skilled in the art will also recognize that a module may be implemented as circuits, logic chips or any sort of discrete component. Further, one skilled in the art will also recognize that a module may be implemented in software which may then be executed by a variety of processors. In some embodiments of the invention, a module may also comprise computer instructions or executable code that may instruct a computer processor to carry out a sequence of events based on instructions received. The choice of the implementation of the modules is left as a design choice to a person skilled in the art and does not limit the scope of this invention in any way.

Figure 1:
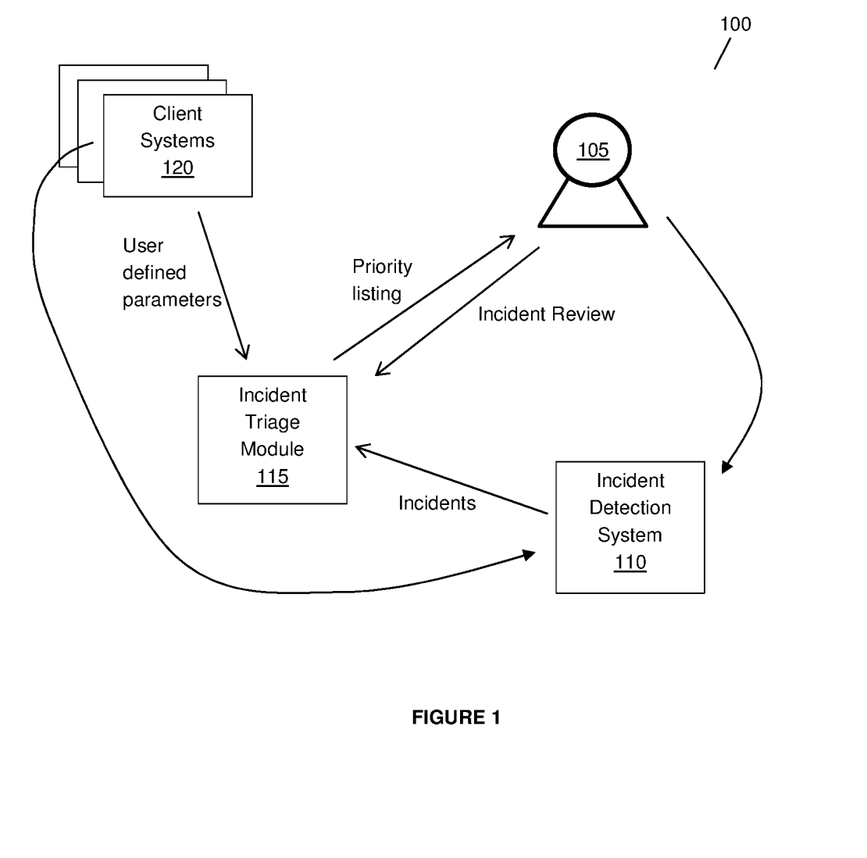
FIG. 1 illustrating a block diagram representative of an incident triage module in accordance with embodiments of the invention whereby the incident triage module has been incorporated into an incident detection system.

FIG. 1 illustrates system 100 for handling and prioritizing incidents detected by an incident detection system in accordance with some embodiments of the invention. System 100 comprises incident detection system 110, incident triage broker 115, client systems 120 and intelligence analysts 105. Throughout this description, incident triage broker and incident triage module will be used interchangeably but one skilled in the art will recognize that they both refer to an incident triage broker having a number of modules contained within to perform functions or processes in accordance with many embodiments of the invention.

Intelligence analysts 105 may comprise of at least one or a team of intelligence analysts who have the required skillsets to analyse and resolve incidents detected by the system. This team of highly skilled personnel may reside in a command centre and may liaise with modules and/or systems in system 100 such as incident detection system 110 and incident triage module 115 through various communicative means. The task of security analyst 105 is to provide configuration updates and rule updates to incident detection system 110 and to resolve incidents and subsequently provide incident resolution updates to incident triage module 115. The information transmitted from security analyst 105 is then utilized by the respective modules to optimize their respective processes.

In general, incident detection system 110 comprises a hub that has been configured to receive and collate all the security events detected at various monitoring devices in a monitored computer network. As an example, if client system A includes a network under monitor, various types of monitoring devices would be strategically interspersed between network devices of the client's system. Any security events detected by these monitoring devices would then be provided to incident detection system 110 which then in turn converts verified security events into incidents. Examples of the incidents comprise, but are not limited to, malware types of incidents such as root attacks, remote to local attacks, denial of service attacks or probe attacks or physical types of incidents such as hardware failures, e.g. device or network component errors.

Client systems 120 may comprise one or a plurality of clients whereby these clients' computer networks are monitored by incident detection system 110 as previously described. Each client would in turn have a plurality of computer networks that may be linked together or may be distinct and unique from each other. These computer networks typically include a number of network devices and assets such as printers, routers, servers, computers, mobile devices, fax machines, switches, databases, hard disks, and etc. Each asset would be assigned their own severity weightage value by the clients whereby the values of each asset may be determined based on the organization's requirements. In practice, each asset's severity weightage value will actually reflect the business value of the asset to the organization. Further, at a different level, each client's system would be separately allocated a service level weightage value whereby this value indicates the level of importance of the client to system 100. The functions of these service level and severity weightage values will be elucidated in greater detail in the following sections.

As an example, for a business whose primary source of revenue is online shopping or online transactions, such a business would highly likely place a greater value on the accessibility of its website as this online interface is the point of contact that allows the business to function, i.e. for customers to purchase items or services from the business. Hence, network assets or devices that are critical to the normal day to day operations of the business's website, such as the web server, database containing client's personal data, etc. would be of upmost importance to them. If an incident were to occur to compromise any of these network assets, this would result in catastrophic losses for the business. Hence, assets of such importance to the business would typically be assigned high severity weightage values. For such a business, assets such as printers, fax machines or mobile devices would be assigned lower severity weightage values as compared to the web servers and databases due to the lower importance placed on these assets.

As for incident triage module 115, this module is configured to receive incidents from incident detection system 110 and based on certain predetermined rules and user parameters received from client systems 120; module 115 will then generate a prioritized incident list. Incidents received by module 115 will be organized within this list based on the priority of the incidents. For example, incidents of higher priority that require immediate resolution by intelligence analysts 105 will be placed higher up the list or the resolution queue, while lower priority incidents will be positioned lower down the list.

Among the user parameters received by incident triage module 115 from client systems 120 are the client service levels and the respective client base response times. Generally, each client's service level may be divided into a few different categories whereby each category defines the level of importance assigned to the client. Table 1 below illustrates exemplary values that may be assigned to clients to categorize the importance of each client to system 100.

TABLE 1

| Service Level | Value |
| --- | --- |
| Extremely Important | 3 |
| Moderately Important | 2 |
| Important | 1 |
| Normal | 0 |

As illustrated above, Table 1 sets out four service level categories whereby clients who require or who have been assigned with the highest service level will be accorded a value of '3' while clients who only require normal service levels are assigned a value of '0'. One skilled in the art will recognize that the service level categories are not limited to only four categories (e.g. may comprise any number of categories) and that any other similar variations in service level values may be assigned to these service level categories to show the differentiation in service levels for each client without departing from this invention.

As for the client base response time parameter, each of client systems 120 will have their own pre-agreed base response time parameter. For example, client system A may require that high severity incidents have a base response time parameter of 120 minutes while client system B may require that their high severity incidents have a base response time parameter of 60 minutes. Typically, the base response time parameter for client systems 120 is between 1 and 1440 minutes as a response time beyond 1440 minutes would be too inefficient.

Figure 2:
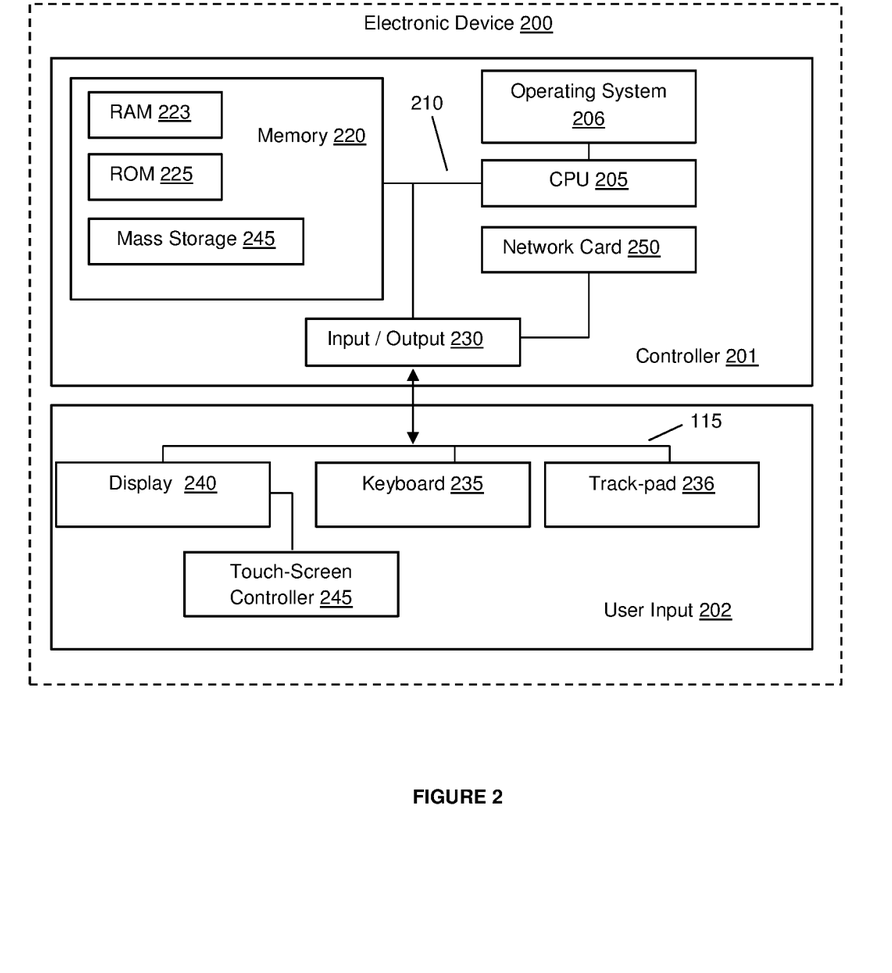
FIG. 2 illustrating a block diagram representative of components in an electronic device or module for implementing embodiments in accordance with embodiments of the invention.

FIG. 2 illustrates a block diagram representative of components of an electronic device 200 that may be provided within module 115 and/or systems 110 and 120 for implementing some embodiments in accordance with some of these embodiments of the invention. These components may also be provided in computing devices that are provided to intelligence analysts 105. One skilled in the art will recognize that the exact configuration of each electronic device provided within each module or system may be different and the exact configuration of electronic device 200 may vary and that the layout and configuration of FIG. 2 is provided by way of example only.

In some embodiments of the invention, device 200 comprises controller 201 and optionally user interface 202. If user interface 202 is provided, user interface 202 is arranged to enable manual interactions between a user and electronic device 200 and for this purpose includes the input/output components required for the user to enter instructions to control electronic device 200. A person skilled in the art will recognize that components of user interface 202 may vary from embodiment to embodiment but will typically include one or more of display 240, keyboard 235 and track-pad 236.

Controller 201 is in data communication with user interface 202 via bus 215 and includes memory 220, Central Processor (CPU) 205 mounted on a circuit board that processes instructions and data for performing the method of some embodiments, an operating system 206, an input/output (I/O) interface 230 for communicating with user interface 202 and a communications interface, in many embodiments in the form of a network card 250. Network card 250 may, for example, be utilized to send data from electronic device 200 via a wired or wireless network to other processing devices or to receive data via the wired or wireless network. Wireless networks that may be utilized by network card 250 include, but are not limited to, Wireless-Fidelity (Wi-Fi), Bluetooth, Near Field Communication (NFC), cellular networks, satellite networks, telecommunication networks, Wide Area Networks (WAN) and etc.

Memory 220 and operating system 206 are in data communication with CPU 205 via bus 210. The memory components include both volatile and non-volatile memory and more than one of each type of memory, including Random Access Memory (RAM) 220, Read Only Memory (ROM) 225 and a mass storage device 245, the last comprising one or more solid-state drives (SSDs). Memory 220 also includes secure storage 246 for securely storing private cryptographic keys such as root keys and/or private keys. It should be noted that the contents within secure storage 246 are only accessible by a super-user or administrator of device 200 and may not be accessed by any simple user of device 200. One skilled in the art will recognize that the memory components described above comprise non-transitory computer-readable media and shall be taken to comprise all computer-readable media except for a transitory, propagating signal. Typically, the instructions are stored as program code in the memory components but can also be hardwired. Memory 220 may include a kernel and/or programming modules such as a software application that may be stored in either volatile or non-volatile memory.

It should be noted that the term "CPU" is used to refer generically to any device or component that can process such instructions and may include: a microprocessor, microcontroller, programmable logic device or other computational device. That is, CPU 205 may be provided by any suitable logic circuitry for receiving inputs, processing them in accordance with instructions stored in memory and generating outputs (for example to the memory components or on display 240). In many embodiments, CPU 205 may be a single core or multi-core processor with memory addressable space. In one example, CPU 205 may be multi-core, comprising—for example—an 8 core CPU.

The workings of system 100 for handling and prioritizing incidents detected by incident detection system 110 may be described as follows, with reference to FIG. 1. When a new client system is added to client systems 120, monitoring devices that are linked to incident detection system 110 will be placed within computer networks belonging to the new client's system. Simultaneously, the client system will provide its user defined parameters to incident triage module 115. The user defined parameters would include severity weightage values assigned to the assets of the new client system, the service level required by the new client system and a pre-agreed base response time parameter for the new client system. It should be note that every system in client systems 120 would have provided these user defined parameters to incident triage module 115 during the initial setup phase when the respective systems are added to system 100.

Once the pre-agreed upon parameters and their respective values have been provided to incident triage module 115, all these parameters will then be stored within memory 220 of module 115.

Figure 3:
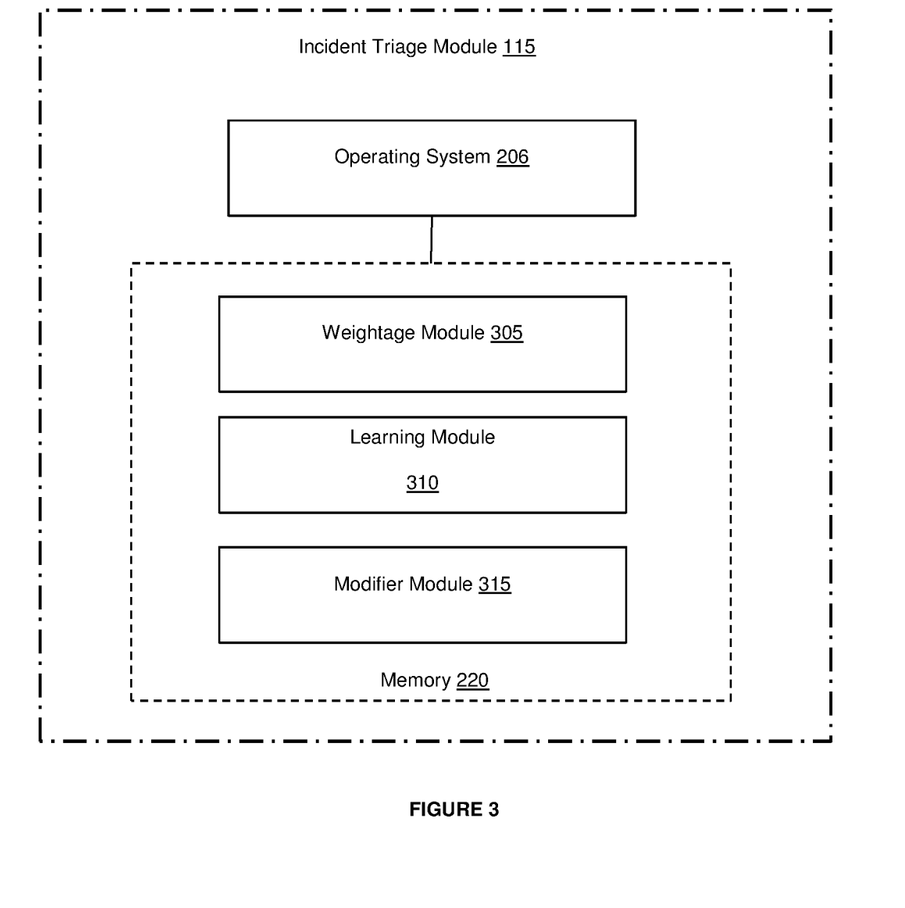
FIG. 3 illustrating a block diagram representative of modules contained in an incident triage module in accordance with embodiments of the invention.

When incidents are detected by incident detection system 110, such incidents will be transmitted onto incident triage module 115. A weightage module 305 (see FIG. 3) will then process the received incidents by computing incident severity scores that are to be assigned to each received incident. These incident severity scores may then be further optimized using learning module 310 and modifier module 315 (as shown in FIG. 3). In particular, temporal decay modifiers will be utilized by modifier module 315 to further optimize the previously obtained incident severity scores. The optimized incident severity scores are then utilized to generate a prioritized incident list and this list is then provided to intelligence analysts 105 for their further action.

Once the intelligence analysts have resolved the incidents according to the importance of the incidents contained in the list, an incident review report will be automatically generated. The incident review report would contain a list of all the incidents resolved, the methods used to resolve the incidents together with the amount of time or duration required to resolve each incident. The incident review report is then forwarded to incident triage module 115 which in turn will utilize this report to further optimize future prioritized incident lists by optimizing the incident severity values accordingly. One skilled in the art will recognize that the incident review report may be in the form of a data file, a document, or any other means for conveying at least the information mentioned above from intelligence analysts 105 to triage module 115.

FIG. 3 illustrates examples of modules contained in incident triage module 115. As described above, module 115 comprises operating system 206 and memory 220. Weightage module 305, learning module 310 and modifier module 315 are all located within memory 220 and these modules may be accessed by incident triage module 115 as required.

When incidents associated with a particular client system are received by incident triage module 115, weightage module 305 will first retrieve a listing of assets associated with the particular client system. Each of these assets would have previously been assigned their own severity weightage values depending on the importance of the asset. To recap, the actual assignment of the severity weightage value to each asset would have been carried out by the client system to which the asset belongs. Information about each asset's severity weightage value would then have been preloaded into incident triage module 115.

Weightage module 305 will then match each received incident with assets affected by each respective incident. The weightage of the affected assets are then utilized to obtain an incident asset score for each incident. In a number of embodiments of the invention, the incident asset score may be obtained using the following formula:

$$\text{Incident Asset Score} = \frac{\Sigma \text{Values of Affected Assets}}{\Sigma \text{Values of All Assets}} \quad (1)$$

The equation above is best explained using the following example. It is assumed that the client's system comprises five assets, A1-A5 whereby the severity weightage values of these five assets are as follows: {A1: 10; A2: 1; A3: 5; A4: 3; A5: 7}. It is also assumed that incident triage module 115 received three incidents, I1-I3, from incident detection system 110 whereby incident I1 affects assets A1 and A2, incident I2 affects assets A1-A5 and incident I3 affects asset A1 only. Using the equation above, the incident asset score for I1 is computed as '0.42', the incident asset score for I2 is computed as '1.0' and the incident asset score for I1 is computed as '0.38'. Based on the obtained scores, this means that incident I2 is the most severe incident as it affects the client's critical assets.

In addition to the above, as weightage module 305 receives and processes the incidents from incident detection system 110, the received incidents are also provided to learning module 310. Learning module 310 is configured to assign incident severity values to each of the received incidents. In an embodiment of the invention, all known or normalized incidents would have been allocated with their own incident severity values by intelligence analysts whereby the more severe incidents would be assigned a higher incident severity value than less severe incidents. For the purposes of this description, a more severe incident refers to an incident type that will result in an asset being severely compromised or being incapacitated for long periods of time. As intelligence analysts uncover new types of incidents and resolve them, the intelligence analysts will simultaneously assign an incident severity value to each of these newly discovered incidents. The methods used to resolve such incidents will also be noted down and all this information is typically contained in the incident review report sent from intelligence analysts 105 to incident triage module 115.

In such an embodiment, when the incidents are received by learning module 310, this module will check a database containing the incident severity values that have been assigned to each incident. If the received incident is not contained within this database, this incident will be flagged as an unknown or un-normalized incident. Alternatively, if the incident may be found within the database, the incident will then be accorded its relevant incident severity value.

In many embodiments of the invention, learning module 310 may contain a machine learning algorithm that has been trained using the attributes of normalized incidents or common incidents together with the methods used to resolve each of the incidents. The machine learning algorithm utilizes normalized incidents as samples and uses this information to compute a function approximation to attempt to match unknown or un-normalized incidents with normalized incidents. For example, learning module 310 may generate a model of the environment based on normalized incidents and the model may be based on various known methods for controlled learning such as the linear regression, logistic regression, support vector machine, K-Means and all other know machine learning methods. The model of the environment is then used to interact with un-normalized incidents to attempt to correlate un-normalized incidents with normalized incidents.

If the model is able to find a close match for an unknown incident with a normalized incident, the model will then assign the unknown incident with an incident severity value that is similar to that of the correlated normalized incident. Alternatively, if the unknown incident was unable to be correlated by the model, the unknown incident will then remain without an incident severity value. In a number of embodiments of the invention, if the model is able to find a close match for an unknown incident with a normalized incident, the model will then assign the unknown incident with a prorated incident severity value based on the incident severity value assigned to the correlated normalized incident. For example, if unknown incident UA is found to be a 90% match with normalized incident AA having an incident severity value of '5', this means that unknown incident UA would be assigned with a prorated incident severity value of '4.5', (i.e. 90% of 5). The generation of the model of the environment may be done by learning module 310 on a daily basis so that newly normalized incidents may be added to the model.

Weightage module 305 will then gather all incidents that have been flagged as unknown incidents and module 305 will then assign incident severity values based on the frequency of occurrence of the unknown incident. This means that unknown incidents that occur more frequently will be assigned a higher incident severity value as compared to an unknown incident that occurs less frequently.

Weightage module 305 then utilizes the incident severity value of each incident and an incident asset score associated with the incident to obtain an incident severity score for each incident. This may be done by multiplying or summing these two values together. Utilizing the example described above, where the incident asset score for I1 was computed as '0.42', the incident asset score for I2 was computed as '1.0' and the incident asset score for I3 was computed as '0.38' and under the assumption that I1 was assigned an incident severity value of '9', I2 was assigned an incident severity value of '2' and I3 was assigned an incident severity value of '5', this means that the incident severity score for I1 may be computed as '9.42', the incident severity score for I2 may be computed as '3' and the incident severity score for I3 may be computed as '5.38' when these two parameters are summed in this example. This shows that although I2 obtained the highest incident asset score, when the incident severity score was computed for I2, it became the least important incident due to the lower incident severity value assigned to I2 while I1 became the most important incident in this example.

Figure 5:
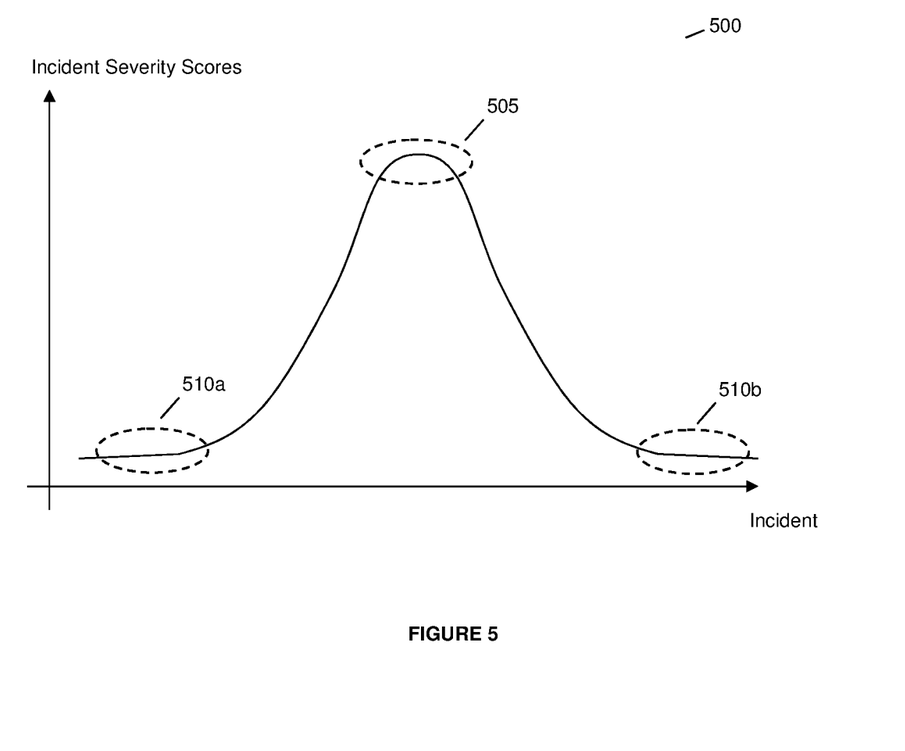
FIG. 5 illustrating an exemplary graph showing the frequency of occurrence of unknown incident types.

In various embodiments of the invention, weightage module 305 then proceeds to plot normalized plot based on the incident severity scores of the incidents. An exemplary graph illustrating the spread of the incident severity scores of the incidents is illustrated in FIG. 5. Plot 500 illustrates an exemplary normalized plot of the incident severity scores of the incidents whereby when the incident severity scores of the incidents have been plotted as a bell curve plot.

Weightage module 305 then applies a reputation converter to outliers of the normalized plot. In this illustration, this means that weightage module 305 will apply a positive reputation coefficient such as a positive multiplier to outlier incidents, i.e. incidents contained within the circles 510a/b, to increase the incident severity scores of incidents in circles 510a/b, e.g. "1.4×incident severity score", while another type of reputation converter such as a negative multiplier (e.g. a multiplier <1.0) may be applied to commonly occurring incidents, i.e. incidents contained within the circle 505 to reduce the incident severity scores of incidents in this circle, e.g. "0.8×incident severity score". The exact details of the plotting of the normalized plots, e.g. the bell curve plot or graph, are omitted for brevity as the plotting of such graphs are known to those skilled in the art. By doing so, this ensure that outlier incidents having abnormally low scores will be attended to in a timely manner before such incidents cause irreversible damage to client's systems.

The final incident severity scores of the incidents are then stored in a database located within weightage module 305. In some embodiments of the invention, the final incident severity scores obtained at this stage may be used to create a prioritized incident list whereby incidents having a higher incident severity score are to be attended to first by intelligence analysts 105 and incidents having a lower incident severity score will be attended to later by the same group of analysts.

In another embodiment of the invention, the prioritized incident list may be generated based on both the incident severity scores of the incidents and the service level of the client whose assets are affected by the incidents. Such a scenario becomes relevant when incident triage module 115 is tasked to receive incidents affecting more than one client. In such a situation, another modifier will then be applied to the incident severity scores in the form of each client's service level. As mentioned in earlier sections, each client would be assigned their own service level value, with more important clients being assigned a higher service level value than normal clients who were assigned lower values. These service level values may then be applied (e.g. multiplied or summed) to the incident severity scores to generate a new set of incident service severity scores for each of the incidents. The new set of scores is then used to generate a new prioritized incident list that is then transmitted to the security analysts.

In many embodiments of the invention, weightage module 305 may plot the new set of incident severity scores (the combination of incident severity scores of the incidents and the service level of the client whose assets are affected by the incidents) as a normalized plot as previously described. Weightage module 305 will then apply reputation converters to specific incidents on the normalized plot (e.g. a positive modifier to outlier incidents contained in circle 510a/b and a negative modifier to common incidents contained in circle 505). The modified incident severity scores obtained at this stage may then be used to generate the prioritized incident list.

The prioritized incident lists described thus far have been generated based on client's service level requirements, client's asset weightages and/or the type of incidents detected. In some embodiments of the invention, the prioritized incident lists may be further optimized based on a temporal parameter, which is each incident's response time. Each incident's response time may be computed based on the incident severity score of the incident and based on the base response time parameter for each client. In a number of embodiments of the invention, each incident's response time may be obtained using the following equation:

$$\text{Incident Response Time} = \text{Base Response time} \times 2^{(\alpha - \text{Incident Severity Score})} \tag{2}$$

where α is a constant having a value equivalent to the largest computed incident severity score for received incidents. This computation is done by modifier module 315.

For example, it is assumed that client A having a base response time of 60 minutes was computed to have incident A1 having an incident severity score of 5 and an incident A2 having an incident severity score of 3 while client B having a base response time of 120 minutes was computed to have incident B1 having an incident severity score of 9 and an incident B2 having an incident severity score of 5. For these examples, the largest computed incident severity score is 9 hence; the value of constant α in this example is 9. When the incident response times for the respective incidents are computed, the incident response times are obtained as follows: A1 having an incident response time of '960 minutes'; A2 having an incident response time of '3840 minutes'; B1 having an incident response time of '120 minutes'; and B2 having an incident response time of '1920 minutes'.

Modifier module 315 will then store the computed incident response times associated with each incident. To recap, once the incidents have been resolved by intelligence analysts 105 according to the importance of the incidents contained in the prioritized incident list, the intelligence analysts will then generate an incident review report. The incident review report containing a list of all the incidents resolved, the methods used to resolve the incidents together with the amount of elapsed time or duration required to resolve each incident is then forwarded to incident triage module 115. It is useful to note that the elapsed time or the duration required to resolve each incident is taken as the time the incident is detected to the time the incident is resolved.

Upon receiving the incident review report, modifier module 315 will extract information relating to the duration required to resolve each incident or the elapsed time of each incident. This information is then combined with the incident response time of each incident to obtain an expiry flag for each incident. In particular, for each incident, if the duration taken to resolve the incident exceeds the incident response time, an expired flag will be tagged to the incident. This means that the analysts took an overly long time to resolve the incident.

Modifier module 315 will then attempted to optimize the prioritized incident list based on this temporal parameter. In some embodiments of the invention, this is achieved by applying a positive modifier (i.e. a value more than '1') to incident severity values of incidents tagged with an expired flag while a negative modifier (i.e. a value less than '1') is applied to incident severity values of incidents that are not tagged with an expired flag. By doing so, module 315 causes the incident severity values and subsequently the incident severity scores of incidents tagged with expired flags to increase so that such future incidents will be attended to at a faster rate as compared to incidents that are resolved in a timely manner. The incident severity values modified by these modifiers are those assigned by learning module 310 to each incident as previously described.

Modifier module 315 then generates an optimized prioritized incident list based on the revised incident severity scores of the incidents. The optimized prioritized incident list is then forwarded onto intelligence analysts 105 for their further action and the process of optimizing the prioritized incident list based on the temporal parameter repeats itself until a minimum number of incidents are tagged with expired flags.

In many embodiments of the invention, once incidents in the prioritized incident list have been attended to, such incidents would automatically be removed from the list. However, there may be certain scenarios whereby not all the incidents on the list may be attended to. When such an event occurs, the list containing the unattended incidents would then be returned to triage module 115. Upon receiving this list, incident triage module 115 may generate a separate notification notifying a system administrator about the existence of such a list or alternatively, incident triage module 115 may automatically close out unattended incidents if incident triage module 115 ascertains that such unattended incidents are actually unimportant incidents such as duplicate incidents that have previously been attended to. For completeness, once such incidents have been automatically closed out, a separate list may then be sent to the system administrator to inform them about the incidents that have been closed out.

In order to provide such a system or method, a process is needed for generating a prioritized incident list based on user parameters and the temporal decay parameters. The following description and FIG. 4 describes a number of embodiments of a process that provide a process for generating and optimizing such a list in accordance with this invention.

Figure 4:
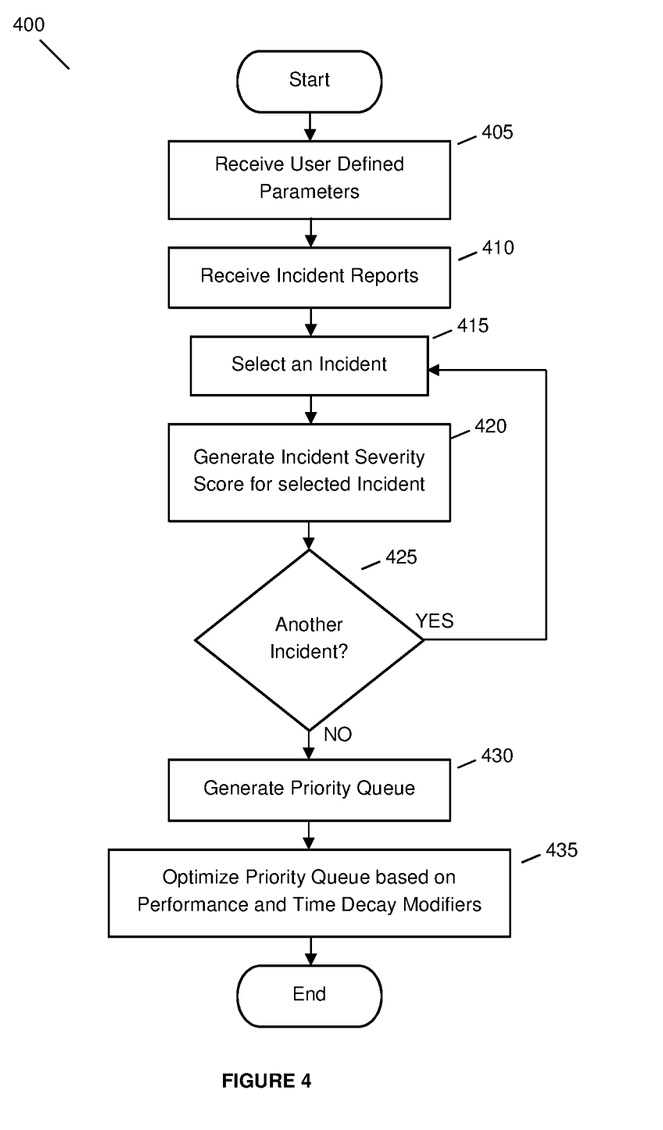
FIG. 4 illustrating a flow diagram of a process for generating and optimizing an incident prioritization queue in accordance with embodiments of the invention.

FIG. 4 illustrates process 400 that is performed by a computer system in a computing device in accordance with some embodiments of the invention. Process 400 begins at step 405 with process 400 receiving user defined parameters such as the client service levels, the respective client base response times and the severity weightages associated with assets in the clients' systems. At step 410, process 400 then receives incidents detected from an incident management system. Process 400 then proceeds to select a first incident from the received incidents at step 415. Using the methods described above, process 400 then generates an incident severity score for the selected incident at step 420.

Process 400 then determines at step 425 if there is another incident for which process 400 has not yet generated an incident severity score. If there is another such incident, process 400 returns to step 415 and repeats steps 415 to 425 until incident severity scores have been generated for all the incidents.

Process 400 then proceeds to step 430 whereby process 400 generates a prioritized incident list based on the incident severity scores of the incidents. The prioritized incident list is then forwarded to intelligence analysts who then attend to the incidents in the order set out in the prioritized incident list. Once the analysts have resolved the incidents, the analysts then forward an incident review report containing a list of all the incidents resolved, the methods used to resolve the incidents together with the amount of time or duration required to resolve each incident to process 400.

Upon receiving this report at step 435, process 400 then optimizes the incident severity values and subsequently the incident severity scores of incidents based on information contained within the report. Process 400 then generates an optimized prioritized incident list that is then forward onto the security analysts. Process 400 then ends.

The above is a description of various embodiments of a system and process in accordance with the present invention as set forth in the following claims. It is envisioned that others may and will design alternatives that fall within the scope of the following claims.

The invention claimed is:

1. A method for autonomic incident triage prioritization of incidents affecting a plurality of computer systems, the method performed by a computing module comprising:

receiving user defined parameters associated with each of the computer systems and receiving asset parameters associated with each asset contained within each of the computer systems;

receiving incidents affecting assets of the computer systems;

computing an incident asset score for each incident whereby the incident asset score for each incident is computed using the asset parameters associated with each asset contained within each computer system;

assigning incident severity values to each of the received incidents;

computing incident severity scores for each of the received incidents based on the incident severity value of the incident and the incident asset score of the incident;

generating a prioritized incident list based on the incident severity scores of the received incidents;

providing the prioritized incident list to security analysts;

retrieving, for each incident, identities of assets affected by the incident, wherein for each asset affected by the incident, retrieving identities of all the assets contained in a computer system related to the affected asset;

retrieving severity weightage values accorded to all the retrieved identities of assets wherein the severity weightage values are contained within the received asset parameters; and computing the incident asset score for each incident by summing severity weightage values of assets contained in a computer system affected by the incident, summing the severity weightage values of all the assets in the computer system, and dividing the summed severity weightage values of assets contained in the computer system affected by the incident with the summed severity weightage values of all the assets in the computer system.

2. The method according to claim 1 wherein the assigning the incident severity values to each of the received incidents comprises:

identifying normalized incidents from the received incidents and allocating predetermined incident severity values to normalized incidents;

identifying un-normalized incidents and determining, using a machine learning model, if the un-normalized incidents may be matched to normalized incidents; whereby for each un-normalized incident that matches a normalized incident, allocating the incident severity value of the normalized incident to the un-normalized incident;

for each un-normalized incident that does not match a normalized incident, allocating a predetermined high incident severity value to the un-normalized incident whereby the high incident severity value comprises a value that is within an upper range of the predetermined incident severity values for normalized incidents.

3. The method according to claim 1 wherein the assigning the incident severity values to each of the received incidents comprises:

identifying normalized incidents from the received incidents and allocating predetermined incident severity values to normalized incidents;

identifying un-normalized incidents and determining, using a machine learning model, if the un-normalized incidents may be a close match to normalized incidents; whereby for each un-normalized incident that is a close match of a normalized incident, allocating a prorated incident severity value of the normalized incident to the un-normalized incident based on the percentage of the match between the un-normalized incident and the close matched normalized incident;

for each un-normalized incident that does not match a normalized incident, allocating a predetermined high incident severity value to the un-normalized incident whereby the high incident severity value comprises a value that is within an upper range of the predetermined incident severity values for normalized incidents.

4. The method according to claim 1 wherein the user defined parameters comprises service level values associated with each of the computer systems and whereby the computing the incident severity scores for each of the received incidents based on the incident severity value of the incident and the incident asset score of the incident comprises:

applying the service level values associated with each computer system to incident severity scores of incidents that affect assets of the computer system.

5. The method according to claim 1 wherein the computing the incident severity scores for each of the received incidents based on the incident severity value of the incident and the incident asset score of the incident comprises:

plotting a normalized plot using the incident severity scores of the received incidents;

determining outlier incidents using the normalized plot; and applying a positive reputation coefficient to the incident severity scores of the outlier incidents, whereby the positive reputation coefficient causes incident severity scores of the outlier incidents to increase.

6. The method according to claim 5 further comprising:

determining from the normalized plot commonly occurring incidents; and applying a negative reputation coefficient to the incident severity scores of the commonly occurring incidents whereby the negative reputation coefficient causes incident severity scores of the commonly occurring incidents to decrease.

7. The method according to claim 1 wherein the user defined parameters comprises base response time parameters that are associated with each of the computer systems, the method further comprising:

computing an incident response time for each of the received incidents based on the base response time parameter of the computer system associated with each incident and the incident severity score of each received incident, the incident response time being determined as:

$$\text{Incident Response Time} = \text{Base Response time} \times 2^{(\alpha - \textit{Incident Severity Score})}$$

where $\alpha$ is a constant having a value equivalent to a largest computed incident severity score for received incidents.

8. The method according to claim 7 further comprising:

receiving elapsed time for the received incidents from the security analysts;

determining, for each received incident, if the elapsed time of the incident exceeds the incident response time of the incident;

tagging incidents having elapsed time that exceeds the incident response time of the incident with an expired flag; and optimizing the predetermined incident severity values of normalized incidents tagged with expired flags.

9. The method according to claim 8 wherein the optimizing the predetermined incident severity values of normalized incidents tagged with expired flags comprises:
applying a positive reputation coefficient to the incident severity value of incidents tagged with the expired flag to cause these incident severity values to increase.

10. The method according to claim 1 further comprising:
receiving an unresolved incident list from the intelligence analysts wherein the unresolved incident list comprises incidents that remain unresolved;
notifying a system administrator of the unresolved incidents in the unresolved incident list; and
removing the unresolved incidents from the computing module.

11. A system for autonomic incident triage prioritization of incidents affecting a plurality of computer systems, the system comprising:
a processing unit; and
a non-transitory media readable by the processing unit, the media storing instructions that when executed by the processing unit, cause the processing unit to:
receive user defined parameters associated with each of the computer systems and receiving asset parameters associated with each asset contained within each of the computer systems;
receive incidents affecting assets of the computer systems;
compute an incident asset score for each incident whereby the incident asset score for each incident is computed using the asset parameters associated with each asset contained within each computer system;
assign incident severity values to each of the received incidents;
compute incident severity scores for each of the received incidents based on the incident severity value of the incident and the incident asset score of the incident;
generate a prioritized incident list based on the incident severity scores of the received incidents;
provide the prioritized incident list to security analysts;
instructions for directing the processing unit to:
retrieve, for each incident, identities of assets affected by the incident, wherein for each asset affected by the incident, retrieving identities of all the assets contained in a computer system related to the affected asset;
retrieve severity weightage values accorded to all the retrieved identities of assets wherein the severity weightage values are contained within the received asset parameters;
compute the incident asset score for each incident by summing severity weightage values of assets contained in a computer system affected by the incident, summing the severity weightage values of all the assets in the computer system, and divide the summed severity weightage values of assets contained in the computer system affected by the incident with the summed severity weightage values of all the assets in the computer system.

12. The system according to claim 11 wherein the instructions to assign the incident severity values to each of the received incidents comprises:
instructions for directing the processing unit to:
identify normalized incidents from the received incidents and allocating predetermined incident severity values to normalized incidents;
identify un-normalized incidents and determining, using a machine learning model, if the un-normalized incidents may be matched to normalized incidents; whereby
for each un-normalized incident that matches a normalized incident, allocating the incident severity value of the normalized incident to the un-normalized incident;
for each un-normalized incident that does not match a normalized incident, allocating a predetermined high incident severity value to the un-normalized incident whereby the high incident severity value comprises a value that is within an upper range of the predetermined incident severity values for normalized incidents.

13. The system according to claim 11 wherein the instructions to assign the incident severity values to each of the received incidents comprises:
instructions for directing the processing unit to:
identify normalized incidents from the received incidents and allocating predetermined incident severity values to normalized incidents;
identify un-normalized incidents and determining, using a machine learning model, if the un-normalized incidents may be a close match to normalized incidents; whereby
for each un-normalized incident that is a close match of a normalized incident, allocating a prorated incident severity value of the normalized incident to the un-normalized incident based on the percentage of the match between the un-normalized incident and the close matched normalized incident;
for each un-normalized incident that does not match a normalized incident, allocating a predetermined high incident severity value to the un-normalized incident whereby the high incident severity value comprises a value that is within an upper range of the predetermined incident severity values for normalized incidents.

14. The system according to claim 11 wherein the user defined parameters comprises service level values associated with each of the computer systems and whereby the instructions to compute the incident severity scores for each of the received incidents based on the incident severity value of the incident and the incident asset score of the incident comprises:
instructions for directing the processing unit to:
apply the service level values associated with each computer system to incident severity scores of incidents that affect assets of the computer system.

15. The system according to claim 11 wherein the instructions to compute the incident severity scores for each of the received incidents based on the incident severity value of the incident and the incident asset score of the incident comprises:
instructions for directing the processing unit to:
plot a normalized plot using the incident severity scores of the received incidents;
determine outlier incidents using the normalized plot; and
apply a positive reputation coefficient to the incident severity scores of the outlier incidents, whereby the positive reputation coefficient causes incident severity scores of the outlier incidents to increase.

16. The system according to claim 15 further comprising:
instructions for directing the processing unit to:
- determine from the normalized plot commonly occurring incidents; and
- apply a negative reputation coefficient to the incident severity scores of the commonly occurring incidents whereby the negative reputation coefficient causes incident severity scores of the commonly occurring incidents to decrease.

17. The system according to claim 10 wherein the user defined parameters comprises base response time parameters that are associated with each of the computer systems, the method further comprising:
instructions for directing the processing unit to:
- compute an incident response time for each of the received incidents based on the base response time parameter of the computer system associated with each incident and the incident severity score of each received incident, the incident response time being determined as:

$$\text{Incident Response Time} = \text{Base Response time} \times 2^{(\alpha - \text{Incident Severity Score})}$$

where $\alpha$ is a constant having a value equivalent to a largest computed incident severity score for received incidents.

18. The system according to claim 17 further comprising:
instructions for directing the processing unit to:
- receive elapsed time for the received incidents from the security analysts;
- determine, for each received incident, if the elapsed time of the incident exceeds the incident response time of the incident;
- tag incidents having elapsed time that exceeds the incident response time of the incident with an expired flag; and
- optimize the predetermined incident severity values of normalized incidents tagged with expired flags.

19. The system according to claim 18 wherein the instructions to optimize the predetermined incident severity values of normalized incidents tagged with expired flags comprises:
instructions for directing the processing unit to:
- apply a positive reputation coefficient to the incident severity value of incidents tagged with the expired flag to cause these incident severity values to increase.

20. The system according to claim 11 further comprising:
instructions for directing the processing unit to:
- receive an unresolved incident list from the intelligence analysts wherein the unresolved incident list comprises incidents that remain unresolved;
- notify a system administrator of the unresolved incidents in the unresolved incident list; and
- remove the unresolved incidents from the computing module.

\* \* \* \* \*